United States Patent
Zheng et al.

(10) Patent No.: US 10,268,745 B2
(45) Date of Patent: Apr. 23, 2019

(54) INHERITED DIMENSIONS

(71) Applicant: Oracle International Corporation, Redwood Shores, CA (US)

(72) Inventors: Joseph Zheng, Redwood City, CA (US); Edwin Meijer, Redwood City, CA (US); Robert Paul, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 319 days.

(21) Appl. No.: 15/057,056

(22) Filed: Feb. 29, 2016

(65) Prior Publication Data

US 2016/0350393 A1 Dec. 1, 2016

Related U.S. Application Data

(60) Provisional application No. 62/168,661, filed on May 29, 2015, provisional application No. 62/245,945, filed on Oct. 23, 2015.

(51) Int. Cl.
  *G06F 17/30* (2006.01)

(52) U.S. Cl.
  CPC .... *G06F 17/30592* (2013.01); *G06F 17/3048* (2013.01); *G06F 17/30132* (2013.01); *G06F 17/30477* (2013.01); *G06F 17/30489* (2013.01)

(58) Field of Classification Search
  None
  See application file for complete search history.

(56) References Cited

U.S. PATENT DOCUMENTS

| | | | |
|---|---|---|---|
| 5,317,727 | A | 5/1994 | Tsuchida et al. |
| 5,544,342 | A | 8/1996 | Dean |
| 6,694,322 | B2 | 2/2004 | Warren et al. |
| 6,973,457 | B1 | 12/2005 | Bastawala et al. |
| 7,181,450 | B2 | 2/2007 | Malloy et al. |
| 7,366,730 | B2 | 4/2008 | Greenfield et al. |
| 7,792,784 | B2 | 9/2010 | Gupta |

(Continued)

OTHER PUBLICATIONS

Rhodes et al., "Iteration Aware Prefetching for Large Multidimensional Scientific Datasets", in Proceedings of the 17th International Conference on Scientific and Statistical Database Managements, 2005, 10 pages. (Year: 2005).

(Continued)

*Primary Examiner* — Jau Shya Meng
(74) *Attorney, Agent, or Firm* — Invoke

(57) ABSTRACT

An inherited dimension comprises one or more base dimension objects and one or more specialized dimension objects that are stored in a non-transitory volatile or non-volatile computer-readable storage. Each base dimension object of the one or more base dimension objects has a first set of dimension attributes that are common across the plurality of multidimensional datasets. The one or more specialized dimension objects include a specialized dimension object that has a second set of dimension attributes for a particular multidimensional dataset from the plurality of multidimensional datasets. In response to receiving a query that references the dimension and targets the particular multidimensional dataset, a base dimension object and the specialized dimension object are accessed to generate a query result.

20 Claims, 5 Drawing Sheets

(56) References Cited

U.S. PATENT DOCUMENTS

| | | | |
|---|---|---|---|
| 7,895,191 B2 | 2/2011 | Colossi et al. | |
| 7,953,694 B2 | 5/2011 | Colossi et al. | |
| 8,001,112 B2 | 8/2011 | Dombroski et al. | |
| 8,209,280 B2 | 6/2012 | Kearney et al. | |
| 8,572,649 B1 | 10/2013 | Gossweiler et al. | |
| 8,612,421 B2 | 12/2013 | Dombroski et al. | |
| 9,058,357 B1 | 6/2015 | Birnbaum et al. | |
| 9,288,256 B2 | 3/2016 | Goodwin | |
| 9,396,287 B1 | 7/2016 | Bhave et al. | |
| 9,411,853 B1 | 8/2016 | Dovrtel et al. | |
| 9,740,741 B2 | 8/2017 | Plattner et al. | |
| 2002/0029207 A1* | 3/2002 | Bakalash | G06F 17/30457 |
| 2002/0087798 A1 | 7/2002 | Perincherry et al. | |
| 2002/0107835 A1 | 8/2002 | Coram et al. | |
| 2003/0093647 A1 | 5/2003 | Mogi et al. | |
| 2004/0139061 A1* | 7/2004 | Colossi | G06F 17/30592 |
| 2004/0215626 A1 | 10/2004 | Colossi et al. | |
| 2004/0236726 A1 | 11/2004 | Ewing et al. | |
| 2005/0157659 A1 | 7/2005 | Huitema | |
| 2006/0230024 A1 | 10/2006 | Lei et al. | |
| 2006/0271507 A1* | 11/2006 | Anzalone | G06F 17/30592 |
| 2008/0270449 A1 | 10/2008 | Gossweiler et al. | |
| 2008/0271080 A1 | 10/2008 | Gossweiler et al. | |
| 2011/0320415 A1 | 12/2011 | Berger et al. | |
| 2012/0162265 A1 | 6/2012 | Heinrich et al. | |
| 2012/0166384 A1 | 6/2012 | Nos et al. | |
| 2013/0031204 A1 | 1/2013 | Graham et al. | |
| 2013/0080388 A1 | 3/2013 | Dwyer et al. | |
| 2013/0132967 A1 | 5/2013 | Soundararajan et al. | |
| 2013/0191523 A1 | 7/2013 | Buck et al. | |
| 2014/0052956 A1 | 2/2014 | Moll | |
| 2014/0289183 A1 | 9/2014 | Dipper et al. | |
| 2014/0310232 A1 | 10/2014 | Plattner et al. | |
| 2015/0212943 A1 | 7/2015 | Yang et al. | |
| 2015/0378920 A1 | 12/2015 | Gierach et al. | |
| 2015/0379957 A1 | 12/2015 | Roegelein et al. | |
| 2016/0132790 A1 | 5/2016 | Weissman | |
| 2016/0350305 A1 | 12/2016 | Shen et al. | |
| 2016/0350393 A1 | 12/2016 | Zheng et al. | |

OTHER PUBLICATIONS

Markl et al., "Improving OLAP Performance by Multidimensional Hierarchical Clustering", in Proceedings of International Database Engineering and Applications Symposium (IDEAS' 99), 1999, 13 pages. (Year: 1999).

* cited by examiner

INHERITED DIMENSIONS

CROSS-REFERENCE TO RELATED APPLICATIONS; BENEFIT CLAIM

This application claims the benefit of Provisional Appln. 62/245,945, filed Oct. 23, 2015, the entire contents of which are hereby incorporated by reference as if fully set forth herein, under 35 U.S.C. § 119(e). This application also claims the benefit of Provisional Appln. 62/168,661, filed May 29, 2015, the entire contents of which are hereby incorporated by reference as if fully set forth herein, under 35 U.S.C. § 119(e).

This application is related to application Ser. No. 15/057,053, entitled "PREFETCHING ANALYTICAL RESULTS ACROSS MULTIPLE LEVELS OF DATA", filed Feb. 29, 2016, the entire contents of which are hereby incorporated by reference as if fully set forth herein.

FIELD OF THE DISCLOSURE

The present disclosure generally relates to online analytical processing (OLAP) and, more particularly, to systems, technical steps, and stored instructions for fetching, processing, and modelling data in multidimensional datasets.

BACKGROUND

Database systems are often designed to maintain a relatively large amount of information about a variety of entities, events, or occurrences (referred to generally as occurrences), and these occurrences may be described by a variety of characteristics. Even database systems that do not yet contain large amounts of information are often designed to be scalable such that the database systems can be adapted to accommodate ever-increasing amounts of data. Some tables are so large, due to the fact that they include every occurrence and every characteristic of every occurrence, that they may be impossible to analyze if there are not enough resources to store and process significant portions of these tables. Even if sufficient resources are available, storing and processing significant portions of these large tables can be quite costly. As a result, when occurrences have many characteristics or are otherwise related to a variety of information, many database systems separate such information about the occurrences into multiple tables.

Database systems often group tables based on categories of characteristics. Much of the information may be descriptive information about entities, categories, or classes of information (referred to generally as categories) involved in the occurrences. The description of these underlying categories may change infrequently compared to the other tables that record or measure the occurrences themselves. Dimension tables are tables that contain descriptive information about occurrences that are referenced by or may be referenced by other table(s). The other table(s) include column(s) that reference row(s) of the dimension table(s), and each referencing column identifies what is referred to as a dimension of column(s) that occur in dimension table(s). Data that is organized into two or more dimensions is referred to herein as a multidimensional dataset.

Fact tables are the other tables that measure the occurrences related to the categories. In other words, fact tables store facts or measurable quantitative data, and this measurable data may be involved with or otherwise fall under the categories. By referencing the dimension tables, the fact tables do not need to duplicate all of the information contained in the dimension tables. Generally, because fact tables may include multiple occurrence(s) that reference the same category, fact tables are usually larger than dimension tables. Also, because fact tables measure the occurrences rather than recording the definitions, the fact tables are usually updated more frequently than dimension tables. An organization of multidimensional data into fact table(s) and dimension table(s) is referred to as a star schema.

Queries that operate on data stored in tables that belong to a star schema are referred to as star queries. Star queries often request information from a fact table with filters that are based on characteristics listed in the dimension tables. For example, a star query may request all sales records that involved customers between the ages of 25 and 30. Although the fact table may include all sales records and identify the customers involved in those sales, the fact table likely does not list the respective ages of those customers. Therefore, evaluation of the star query requires a determination of which fact table records identify customers that fall within the requested ages. Such a determination may consume significant amounts of resources for large fact tables and multiple filters.

Some analytical applications initially present an aggregated view of multidimensional data at a particular level. In order to generate the view, an underlying OLAP system typically scans one or more fact tables, which may comprise several million records, to return few rows of data. A request to drill down to a different aggregated view of the multidimensional dataset may trigger a subsequent scan of one or more relatively large tables, which may be computationally expensive. One approach to preserve compute-resources during run-time is to pre-compute aggregated views. The number of possible aggregations, however, may be prohibitively large to continuously calculate and update due to the large possible combinations of dimension granularities. Therefore, this approach may not be feasible where the multidimensional datasets include large amounts of data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1:
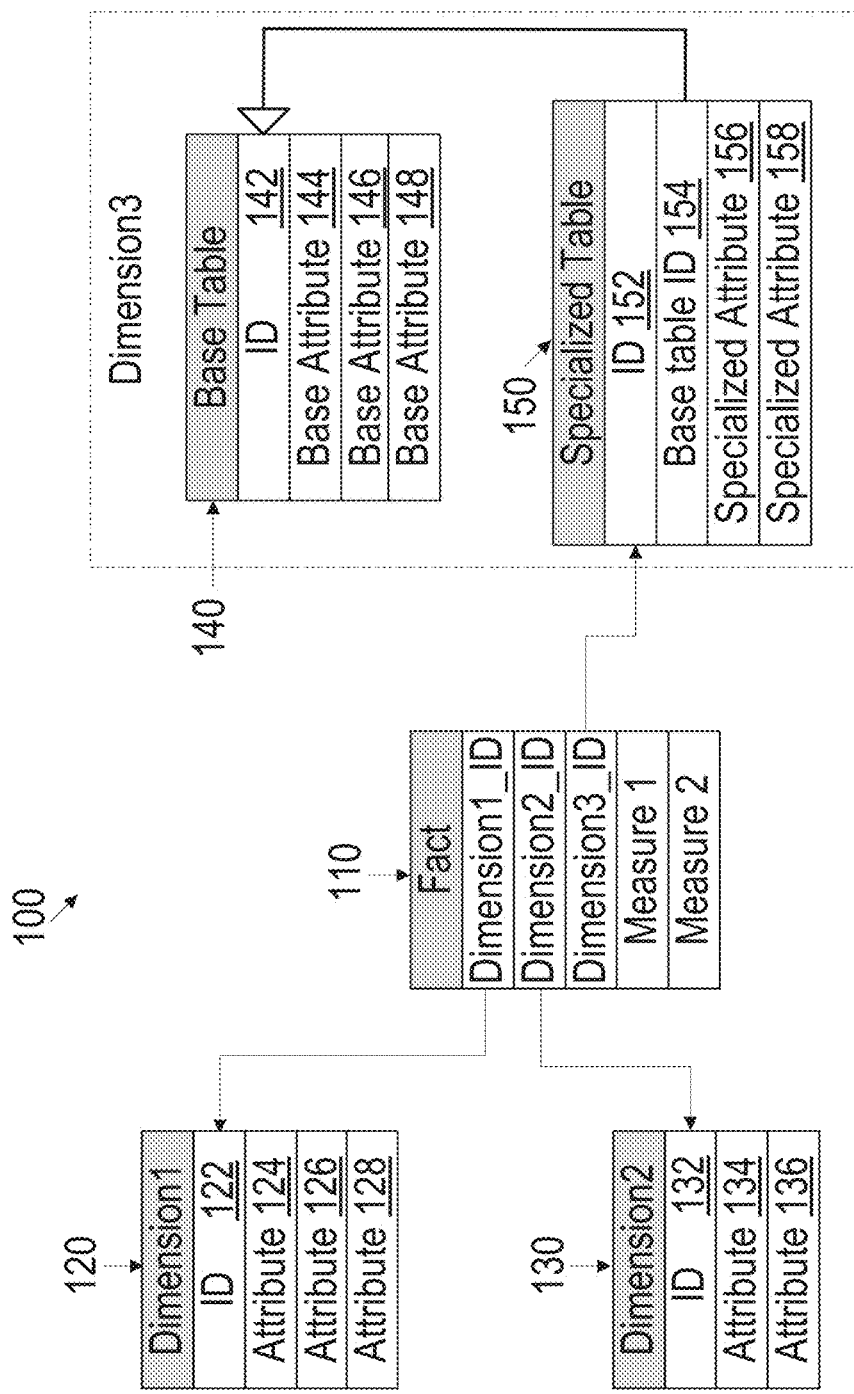
FIG. 1 depicts an example star schema that includes a base dimension object and a specialized dimension object.

In the following description, for the purposes of explanation, numerous specific details are set forth in order to provide a thorough understanding of the present invention.

It will be apparent, however, that the present invention may be practiced without these specific details. In other instances, well-known structures and devices are shown in block diagram form in order to avoid unnecessarily obscuring the present invention.

General Overview

In various embodiments, computer systems, stored instructions, and technical steps are described for implementing inherited dimensions. An "inherited dimension" in this context refers to a dimension in a multidimensional dataset that includes specialized dimension attributes for the multidimensional dataset and inherits dimension attributes that are common across multiple multidimensional datasets. Inherited dimensions provide for flexibility in processing queries and viewing reports that reference different multidimensional datasets. For example, inherited dimensions allow for drilling through different multidimensional datasets on a single report where the dimensions of the multidimensional datasets share common attributes but are not completely identical. As another example, query optimizations such as pre-fetching and top-n ranking may also be performed across multiple datasets using inherited dimensions.

In some embodiments, inherited dimensions are implemented using a plurality of dimension objects, such as dimension tables or other database objects. When a dimension is associated with a plurality of multidimensional datasets, one or more conformed dimension objects and one or more specialized dimension objects are stored in a non-transitory volatile or non-volatile computer-readable storage. Each conformed dimension object of the one or more conformed dimension objects has a first set of dimension attributes that are common across the plurality of multidimensional datasets. The one or more specialized dimension objects include a specialized dimension object that has a second set of dimension attributes for a particular multidimensional dataset from the plurality of multidimensional datasets. In contrast to the first set of dimension attributes, the second set of dimension attributes are not common across the plural of multidimensional datasets.

Different multidimensional datasets may inherit the same common dimension attributes for a particular dimension from the one or more conformed dimension objects. For example, a first multidimensional dataset may reference a first specialized dimension object that is associated with a particular dimension, and a second multidimensional dataset may reference a second specialized dimension object that is associated with the particular dimension. The first specialized dimension object may have a first set of specialized dimension attributes that extend the common dimension attributes inherited from the conformed dimension object, while the second specialized dimension object may have a second set of specialized dimension attributes, different than the first set of specialized dimension attributes, that extend the conformed dimension object.

Queries that target a multidimensional dataset with inherent dimensions may leverage both the common and specialized dimension attributes to generate and display analytic results. For example, in response to receiving a query that references a particular dimension and targets the multidimensional dataset, values from both a conformed dimension object and a specialized dimension object may be accessed. The query result may be generated based on a comparison of one or more of the accessed values with a set of one or more target values. In addition or alternatively, one or more of the accessed values may be included in the query result. The query may access and compare values of common attributes and specialized attributes from one or more other multidimensional datasets. Thus, inherited dimension facilitates comparison of common dimension attributes between different multidimensional datasets while allowing the datasets to maintain distinct dimension attributes.

Inherited Dimension Structure

An inherited dimension is a structure that categorizes data using a base set of dimension attributes and an extended set of dimension attributes. In some embodiments, the base dimension attributes are common across a plurality of multidimensional datasets whereas the extended set of dimension attributes are specialized for a subset of one or more of the plurality of datasets. As an example, a datacenter may include a first OLAP cube for electric-powered automobile sales and a second OLAP cube for gasoline-powered automobile sales. Each cube may have a plurality of dimensions, such as a time dimension, location dimension, and product dimension. One or more of these dimensions may be an inherited dimension. For instance, both the first and second OLAP cube may inherit common product dimension attributes, such as the make, model, and year, to categorize the products sold. The first OLAP cube may extend the common attributes in the product dimensions with attributes that are specialized for electric-powered automobiles, such as battery kilowatt hour (kWh) energy, estimated range on a full charge, etc. The second OLAP cube may also extend the common product dimension attributes, albeit with a different set of attributes that are specialized for gasoline-powered automobiles, such as the number of liters in the engine, average miles-per-gallon, etc.

The structure of an inherited dimension may vary from implementation to implementation. In some embodiments, common dimension attributes are stored in a set of one or more base dimension objects such as in a set of dimension tables. Multiple multidimensional datasets may reference a single base dimension table to inherit the common dimension attributes. In addition or alternatively, multidimensional datasets may inherit the common attributes by referencing different base dimension tables that are conformed.

Separate dimension objects are conformed if structures of the separate dimension objects match. In some embodiments, different base dimension object are conformed if one or more of the following attributes are identical:
Hierarchy names;
Level names;
Level orders; and/or
Key value mappings.

As an example, the first OLAP cube for electric-powered vehicle sales may reference a first base dimension table with the attributes MAKE, MODEL, and YEAR, and the second OLAP cube for gasoline-powered vehicle sales may reference a second base dimension table with the same attributes. The first and second based dimension tables may define identical key-attribute mappings where the same key value maps to the same combination of common attribute values for both tables. The defined hierarchy and levels for each of the attributes may also be the same between the two base tables. By conforming the dimension objects across different multidimensional datasets, the base dimension attributes have a consistent meaning across the different dataset. Thus common dimensional attributes across different multidimensional datasets may be compared efficiently without potentially complex and processor-intensive data normalization during query execution.

Specialized dimension objects are objects that extend a base dimension object. In some embodiments, the specialized dimension objects are implemented as dimension tables that include one or more of the following:
 Specialized hierarchies;
 Specialized levels; and/or
 Specialized attributes.
In the examples presented above where the cubes represent vehicle sales, the first OLAP cube may reference a first specialized dimension table that defines specialized attributes for electric-powered vehicles, and the second OLAP cube may reference a different specialized dimension table that defines specialized attributes for gasoline-powered vehicles. Similarly, specialized dimension tables may be generated for and associated with other multidimensional datasets. Examples of specialized hierarchies, levels, and attributes are detailed in the sections below.

In some embodiments, the base dimension objects and the specialized dimension objects are part of a multidimensional schema. Example schemas may include, without limitation, star schemas, snowflake schemas, and fact constellation schemas. FIG. 1 depicts example star schema 100 that includes a base dimension object and a specialized dimension object. Star schema 100 further includes fact table 110 which references database objects for three separate dimensions. Although three dimensions are depicted in FIG. 1, in other embodiments, a star schema may reference additional or fewer dimension objects depending on the number of dimensions in the multidimensional dataset.

Within star schema 100, dimension table 120 corresponds to a first dimension, and dimension table 130 corresponds to a second dimension. Dimension table 120 includes ID column 122 and attributes 124, 126, and 128, and dimension table 130 includes ID column 132 and attributes 134 and 136. Each attribute may be implemented as a column in the dimension table and may store a corresponding attribute value at each row. The ID columns store primary keys, where each primary key maps to unique combination of values for the corresponding attributes. As an example, dimension table 120 may correspond to a time dimension with attributes 124, 126, and 128 corresponding to different columns for year, month, and day, respectively. ID column 122 maps each unique primary key to a separate combination of attribute values for year, month, and day. The number of attributes and the type of attributes associated with each dimension may vary from implementation to implementation.

Dimension tables 120 and 130 correspond to two separate dimensions that are not inherited dimensions. Star schema 100 also includes a third inherited dimension, which is associated with both base dimension table 140 and specialized table 150. Base dimension table 140 includes ID column 142, base attribute 144, base attribute 146, and base attribute 148. Specialized table 150 includes ID column 152, base table ID column 154, specialized attribute 156, and specialized attribute 158. ID column 142 holds primary keys that map to unique combination of values for the base attributes 144, 146, and 148. Similarly, ID column 152 holds the primary keys for specialized table 150. Base table ID column 154 holds a foreign key that points to base dimension table 140, causing the base table to inherit the attributes referenced by the foreign key. Although only one inherited dimension is depicted, a schema may include more than one inherited dimension in other implementations. In some embodiments, the star schema may define a view that joins base table 140 with specialized table 150 as described further below.

Fact table 110 records measurements or other metrics for a particular event. Fact table 110 includes foreign keys for each of the dimensions. A foreign key in this context refers to a key in one table that references a primary key in another table. Thus, the foreign key for the first dimension references a primary key in ID column 122, the foreign key for the second dimension references a primary key in ID column 132, and the foreign key for the third dimension references a primary key in ID column 142. Fact table 110 further includes measures that record measurement values or other metrics for an event. As an example a fact table for a sales OLAP cube may measure quantity sold and sales price. The number and type of measure included in a fact table may vary from implementation to implementation.

Base dimension table 140 may be a conformed table according to an embodiment. For example, base dimension table 140 may be referenced by one or more other fact tables (not depicted) and associated with one or more different multidimensional datasets. Each multidimensional dataset may include a different specialized table that inherits base attributes 144, 146, and 148. Thus, the base attributes included in base dimension table 140 may be common for the particular dimension across each of the different multidimensional datasets. However, each multidimensional dataset may also include specialized dimension attributes that extend the base dimension attributes.

Specialized Hierarchies, Levels, and Attributes

A specialized dimension object may extend the attributes of a base dimension object as described above. In some embodiments, the specialized dimension object also extends one or more hierarchies defined by a base dimension object. To extend the base hierarchy, the specialized dimension object may be associated with a specialized hierarchy that adds and organizes specialized dimension attributes into an inherited base hierarchy. As an example, the specialized hierarchy may define relationships between the specialized dimension attributes and the inherited base attributes. The specialized object may further add specialized levels to the base hierarchy.

In some embodiments, a specialized hierarchy defines parent-child relationships between one or more specialized dimension attributes and one or more base dimension attributes. Within the specialized hierarchy, a specialized dimension attribute may be defined as a parent that summarizes one or more children dimension attributes, where the children attributes may be other specialized dimensions and/or inherited base dimensions. In addition or alternatively, a specialized dimension attribute may be defined as a child attribute, where the parent may be another specialized dimension or an inherited base dimension attribute. Thus, the specialized hierarchy may modify and extend relationships from an inherited base hierarchy.

In some embodiments, a specialized hierarchy extends the levels of an inherited base hierarchy. For example, if a base hierarchy includes n-levels, where n represents a positive integer and each level is comprised of one or more base dimension attributes, the specialized hierarchy may add one or more additional levels to the hierarchy. The additional levels may comprise one or more specialized dimension attributes. In another example, one or more specialized dimension attributes may be added to the same level as a base dimension attribute.

A multidimensional dataset may have a single hierarchy that inherits levels from a base hierarchy or multiple hierarchies where one or more of the multiple hierarchies inherit levels form one or more base hierarchies. With multiple hierarchies, different drill-down paths are defined for the same multidimensional data set, and the same level may be included in different hierarchies. For instance, a specialize dimension attribute may have a parent-child relationship with a first base or specialized dimension attribute in a first hierarchy and a different base or specialized dimension attribute in a second hierarchy.

Figure 2:
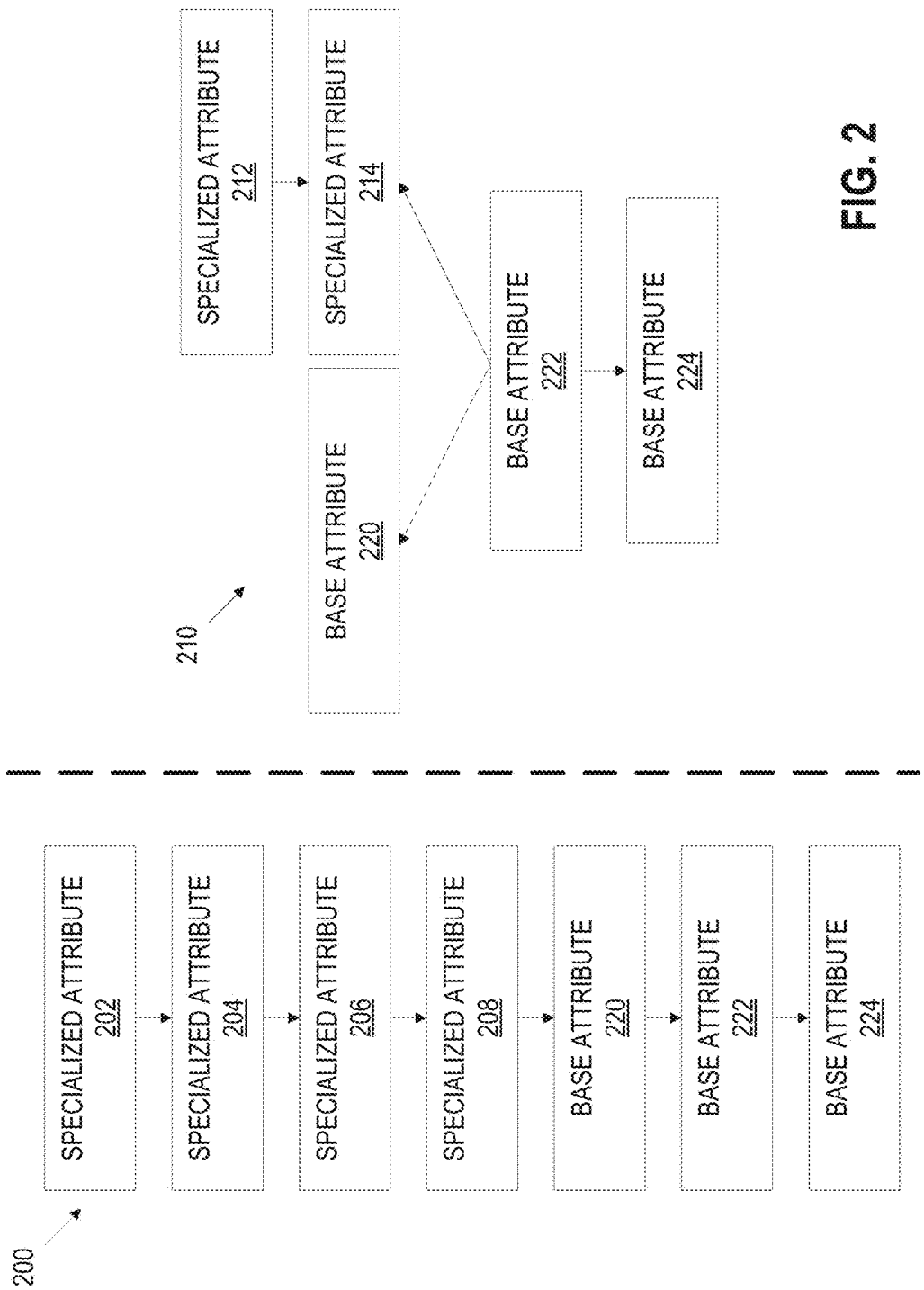
FIG. 2 depicts example specialized hierarchies that extend a common base hierarchy.

FIG. 2 depicts example specialized hierarchies that extend a common base hierarchy. Specialized hierarchy 200 and specialized hierarchy 210 may be generated and stored for separate multidimensional datasets that inherit the same base attributes (base attributes 220, 222, and 224) for a particular dimension or for the same multidimensional dataset that has multiple hierarchies. Specialized hierarchy 200 includes specialized attributes 202, 204, 206, and 208, which extend a base hierarchy that defines the relationship between base attributes 220, 222, and 224. Specialized hierarchy 210 extends the inherited base hierarchy using a different set of specialized dimension attributes, depicted as specialized dimension attributes 212 and 214. The arrows in specialized hierarchies 200 and 210 are drawn from the child level to the parent level. In specialized hierarchy 200, for instance, specialized dimension attribute 202 is a child of specialized dimension attribute, 204, which is a child of specialized dimension attribute 206, etc. Each of specialized dimension attributes 202, 204, 206 and 208 adds a new level to the inherited base hierarchy. Specialized hierarchy 210 introduces a new branch to the hierarchy, where specialized attributes 212 and 214 are descendants of base attribute 222.

Specialized hierarchies 200 and 210 introduce specialized rollups for a particular dimension. A rollup involves summarizing data based on the parent-child attributes defined in the hierarchy. The summary may be computed by aggregating or applying formulas to data from different categories defined for a level below the dimension attribute in the hierarchy. As an example, parent attribute 220 may be summarized by aggregating data from different categories at the level of dimension attribute 208, 206, 204, or 202, but is not summarized by parent dimension attributes 222 or 224. In another example, base dimension attributes 220, 222, and 224 may represent city, state, and country, respectively, along a geographical dimension. Specialized dimension attributes 212 and 214 may represent political sub-district, and political district, respectively. For a multidimensional dataset that measures total sales of a product, the sales at the state level, represented by base dimension attribute 222, summarize the sales at the political district and sub-district levels, represented by specialized dimension attributes 214 and 212, as well as sales at the city level, represented by base dimension attribute 220. That is, the total state sales may be determined by aggregating a) total sales across different political districts within the state; b) total sales across different political sub-districts within the state; or c) total sales across different cities within the state. The dimension attributes that are summarized and the aggregation functions performed in a rollup operation may vary from implementation to implementation.

Specialized hierarchies 200 and 210 also introduce specialized drill through paths for a particular dimension. Drill through paths allow applications or other users to navigate through different levels of a dimension hierarchy. For example, the user may first view total sales at a first level (e.g., state), then drill down to another level (e.g., political district) to analyze data within a multidimensional dataset. A drill down involves navigating to a level below a currently viewed level. That is, the drill down switches a summary view from a parent category to a child category. By contrast, a drill up operation navigates to a level above the currently view level, switching the summary view from a child category to the parent category.

Virtual Dimension Tables

In some embodiments, an inherited dimension may be implemented using a virtual dimension table. A virtual dimension table is logically represented as a single table but is derived from two or more other dimension tables. In this context, the virtual table may be a view that joins one or more base dimension tables and one or more specialized dimension tables. With reference to FIG. 1, for example, a join may be performed based on the foreign key reference in base table ID column 154 and the primary key stored in ID column 142. The result combines records from base dimension table 140 and specialized table 150 where the key values match.

When a query addresses the virtual table, the OLAP system may modify the query to target the underlying base dimension table and specialized dimension table. For example, a SQL SELECT statement that references the dimension may be rewritten using the view that joins the base dimension table and the specialized dimension table. In the context of FIG. 1, for example, a query may be run be run against a view that joins base dimension table 140 and specialized table 150. Applications and other users may thus view and access dimension data for an inherited dimension as if the dimension data were part of a single table. The table joins of the disparate base and specialized tables occurs in a manner that is transparent to the application layer and user.

Multilevel Inheritance

Although some example embodiments above have involved a single level of inheritance, the techniques are also applicable to implement multiple levels of inheritance. With multilevel inheritance, a specialized dimension object may be extended by one or more other specialized dimension objects. In other words, each specialized dimension object inherits dimension attributes, hierarchies, and dimension levels from a parent dimension object.

Figure 3:
FIG. 3 depicts an example of multilevel inheritance where multiple specialized dimension objects extend a base dimension object along an inheritance chain.

FIG. 3 depicts an example of multilevel inheritance, according to an embodiment. Base dimension object 300 defines dimension attribute set 302 and dimension hierarchy 304. Specialized dimension object 310 is a child of base dimension object 300 thereby inheriting dimension attribute set 302 and dimension hierarchy 304. Specialized dimension object 310 extends base dimension object 300 by with dimension attribute set 312 and dimension hierarchy 314. Specialized dimension object 320 is a child of specialized dimension object 310, inheriting dimension attributes and hierarchies from antecedent dimension objects in the inheritance chain. Specialized dimension object 320 extends specialized dimension object 310 with dimension attribute set 322 and dimension hierarchy 324.

Multilevel inheritance allows for different levels of consistency across different groups of multidimensional datasets. For example, a first group of multidimensional datasets may inherit dimension attributes from base dimension object 300. A second group, that may be a subset of the first group, may inherit dimension attributes from specialized dimension object 310. A third subset of one or more of the multidimensional datasets from the second group may be associated with specialized dimension object 320. Other subset of the first group may be associated with different specialized dimension objects (not depicted) to allow for flexibility in categorizing multidimensional data while maintaining consistency meaning across common dimensional attributes.

ETL Operations for Multidimensional Datasets with Inherent Dimensions

During ETL operations, separate ETL processes and ETL logic may be defined for different dimension objects of an inherited dimension. As an example, a first ETL process may perform extraction, transforming, and loading across multiple multidimensional datasets for common dimensional attributes in accordance with first logic. A second ETL process may perform, according to second logic, extraction, transforming, and loading for specialized properties of a multidimensional dataset. Thus, for a particular multidimensional dataset, separate ETL operations may be performed for the base dimension attributes and the specialized attributes of a single dimension.

The logic implemented by the ETL process may vary depending on the metadata maintained for a dimensional object. In some embodiments, an ETL process analyzes for patterns based on the dimension attributes defined for a dimension object to capture changes to the dimension attributes. For example, an ETL process for a base dimensional object may monitor for changes in the base dimensional attributes, and a separate ETL process for a specialized dimensional object may monitor for changes in specialized dimensional attributes. Based on such change tracking, the ETL process identifies when to add a new row to a dimension table. The new row may be assigned a key and related to one or more fact tables. Base dimension objects and specialized dimension objects may use different change tracking logic to load data into respective dimension tables.

As previously indicated, the ETL process and logic for common dimensional attributes may be shared across multiple multidimensional datasets. For instance, a single ETL process may track changes and add rows to a particular base dimension object. Because the base dimension object may be conformed across different multidimensional datasets, a change to the base dimension object by the ETL process applies to each of the multidimensional datasets. Sharing the ETL process and logic may significantly reduce ETL processing overhead that would occur if each multidimensional dataset performed the ETL separately.

Query and Reporting Operations Using Inherited Dimensions

Inherited dimensions may be leveraged by applications and other users to compare common attributes across multiple multidimensional datasets while allowing the multidimensional dataset to have different drill down paths and specialized dimension attributes. As an example, an administrator may wish to compare common attributes across different types of software resources. The software resources may share common dimension attributes, such as name, description, cost center, lifecycle status, etc. However, operating systems may have specialized attributes that are not applicable to database systems, middleware, or other types of software deployments. Similarly, database systems, middleware systems, and other software types may be associated with their own specialized dimension attributes. The common attributes may be compared to a target value that is associated with grouping, aggregation, or otherwise generating analytic results for a query.

Measures, such as CPU utilization, memory usage, and other performance metrics, may be aggregated and compared across common dimension attributes for different multidimensional datasets. In some embodiments, aggregations may occur across different specialized hierarchies and combined at the common attribute level for the inherited dimension. As an example, the CPU performance (or other metric) may be grouped by lifecycle status across different multidimensional cubes. Records form different multidimensional datasets that have the same lifecycle status may be grouped together for aggregation to compute the average CPU performance. The user may then drill down by selecting to see CPU performance of target with a mission critical lifecycle status. The next level may aggregate based on the target type to show different CPU performance for different target types that are mission critical. For example, the next level may group and aggregate performance for mission critical database systems, mission critical middleware, etc. The user may select a particular target type to view individual performance grouped by sub-target types. If the user clicks on the mission critical database systems to drill down, for instance, the user may be presented with a new summary view that groups statistics based on different types of database systems, which may be classified by attributes specific to the database. The user may further drill down to see the performance of individual database instances.

Figure 4:
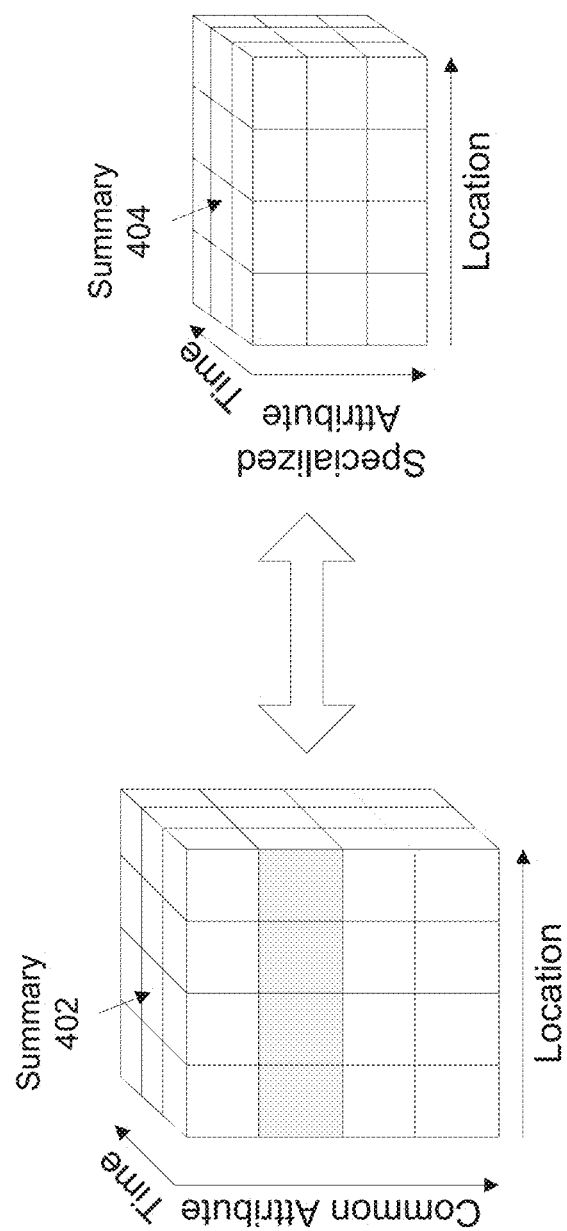
FIG. 4 depicts an example drill-down path for a multidimensional dataset that includes an inherited dimension.

As indicated above, the user may navigate from a summary view that compares common attributes to views that compare specialized attributes. FIG. 4 depicts an example drill-down path for a multidimensional dataset that includes an inherited dimension. Summary view 402 shows a view at a first level where the y-axis represents different values for a common attributes. For example, a target type attribute may have one row for databases, another for OSes, another for middleware, etc. Upon selecting one of the rows, the user drills down to summary view 404. The y-axis of summary view 404 corresponds to a specialized attribute. For instance, if database is selected, the specialized during drill-down operations, the specialized attributes may show different types of database classified by specific database attributes. The databases may be grouped based on whether they are clustered, OLAP, online transaction processing (OLTP), etc. One or more queries may be generated to compute analytic result sets for the level viewed at each summary view.

Techniques for pre-fetching may be applied to inherited dimensions. In some embodiments, the pre-fetch range may cover both common and specialized attributes. As an example, while viewing summary view 402, the analytic results for summary view 404 may be pre-fetched and cached. Pre-fetching may happen across different specialized hierarchies of an inherited dimension as well. For instance, if database systems and OS systems have different specialized dimension hierarchies with different specialized attributes, aggregations may be performed along each of the different specialized dimension hierarchies for each of the specialized attributes within the pre-fetch range to pre-fetch the analytic result sets.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
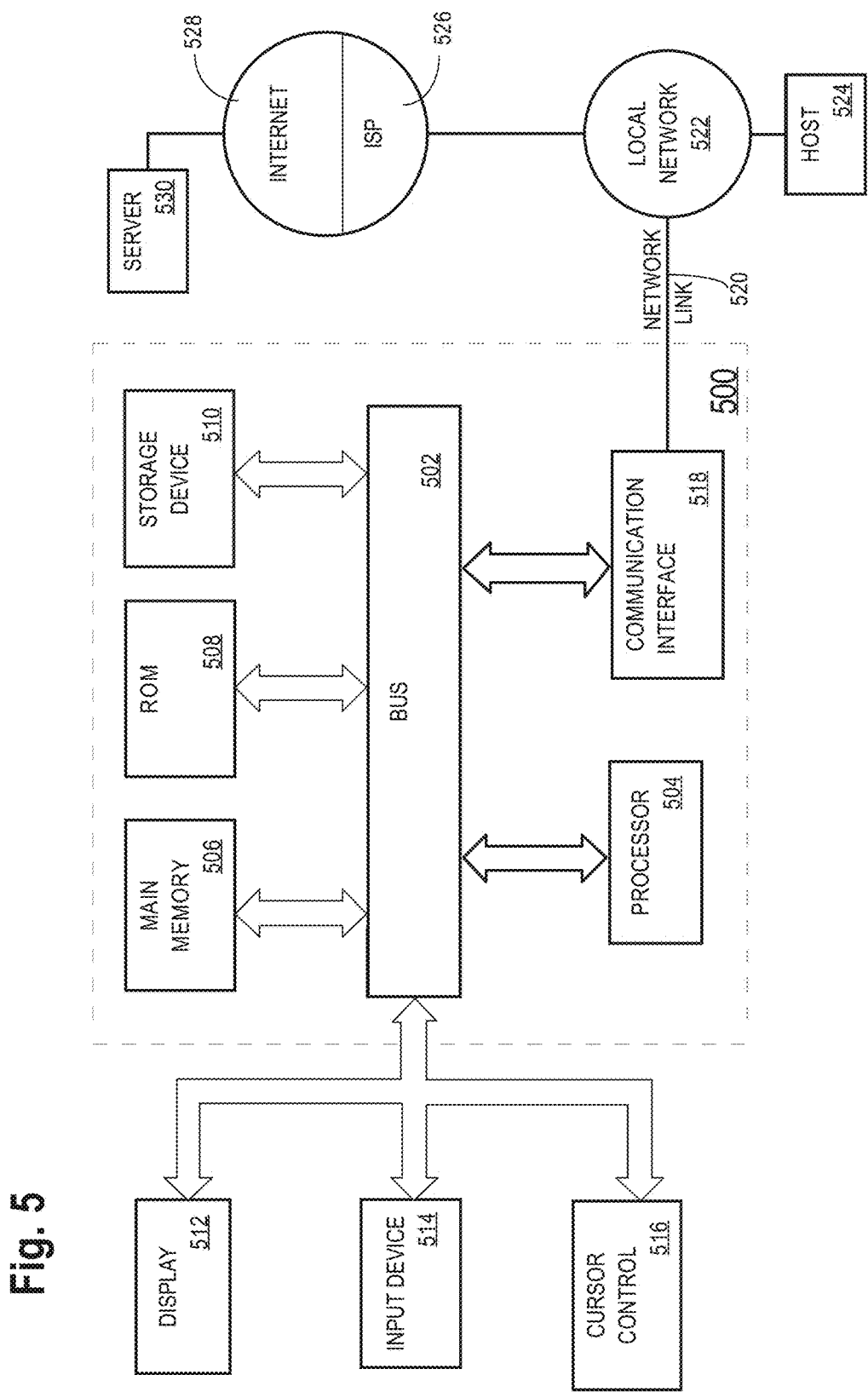
FIG. 5 depicts an example computer system upon which some embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Extensions and Alternatives

In the foregoing specification, embodiments of the invention have been described with reference to numerous specific details and embodiments that are combinable in different ways and that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, for a dimension that is associated with a plurality of multidimensional datasets, one or more base dimension objects;
   wherein a base dimension object of the one or more base dimension objects has a first set of dimension attributes that are common across the plurality of multidimensional datasets;
   storing, for a particular multidimensional dataset of the plurality of multidimensional datasets, a specialized dimension object that extends the base dimension object of the one or more base dimension objects;
   wherein the specialized dimension object has a second set of dimension attributes for a particular multidimensional dataset from the plurality of multidimensional datasets;
   wherein the second set of dimension attributes are not in one or more other multidimensional datasets of the plurality of multidimensional datasets;
   in response to receiving a query that references the dimension and targets the particular multidimensional dataset,
      accessing the base dimension object of the one or more base dimension objects and the specialized dimension object; and
      generating a set of one or more results for the query based on the base dimension object and the specialized dimension object.

2. The method of claim 1, the method further comprising:
   storing, for a second multidimensional dataset of the plurality of multidimensional datasets, a second specialized dimension object that extends the base dimension object of the one or more base dimension objects;
   wherein the second specialized dimension object has a third set of dimension attributes for the second multidimensional dataset;
   wherein the third set of dimension attributes is different than the second set of dimension attributes.

3. The method of claim 2,
   wherein the dimension, when referenced by the particular multidimensional dataset, is associated with the base dimension object and the specialized dimension object stored for the particular multidimensional dataset;
   wherein the dimension, when referenced by the particular multidimensional dataset, is not associated with the second specialized dimension object stored for the second multidimensional dataset.

4. The method of claim 2,
   wherein the set of one or more results is generated, based in part, on comparing a first value for a first dimension attribute of the first set of dimension attributes and a second value for the first dimension attribute of the first set of dimension attributes with a target value;
   wherein the first value is accessed from the particular multidimensional dataset and the second value is accessed from the second multidimensional dataset;
   wherein the set of one or more results includes a third value for a second dimension attribute of the second set of dimension attributes and a fourth value for a third dimension attribute of the third set of dimension attributes;
   wherein the third value is accessed from the particular multidimensional dataset and the fourth value is accessed from the second multidimensional dataset.

5. The method of claim 1,
   wherein the particular multidimensional dataset stores data according to a star schema;
   wherein the star schema defines a view that joins the base dimension object and the specialized dimension object.

6. The method of claim 1,
   wherein each base dimension object of the one or more base dimension objects defines a hierarchy for the first set of dimension attributes that is common across the plurality of multidimensional datasets;
   wherein the specialized dimension object defines an extended hierarchy that extends the hierarchy for the first set of dimension attributes based on the second set of dimension attributes.

7. The method of claim 1,
   wherein the specialized dimension object defines a first specialized drill down path for the dimension when referenced by the particular multidimensional dataset;
   wherein a second specialized dimension object defines a second specialized drill down path for the dimension when referenced by a second multidimensional dataset;
   wherein the first specialized drill down path is different than the second specialized drill down path for the dimension.

8. The method of claim 7, further comprising generating and displaying a graphical user interface (GUI) object that allows a user to perform a drill down operation and a drill up operation along the first specialized drill down path and along the second specialized drill down path.

9. The method of claim 1, wherein the one or more base dimension objects include a plurality of base dimension objects that are conformed dimension objects.

10. The method of claim 1, wherein the base dimension object is referenced by two or more multidimensional datasets of the plurality of multidimensional datasets.

11. One or more non-transitory computer-readable media storing instruction which, when executed by one or more processors, cause operations comprising:
    storing, for a dimension that is associated with a plurality of multidimensional datasets, one or more base dimension objects;
    wherein a base dimension object of the one or more base dimension objects has a first set of dimension attributes that are common across the plurality of multidimensional datasets;
    storing, for a particular multidimensional dataset of the plurality of multidimensional datasets, a specialized dimension object that extends the base dimension object of the one or more base dimension objects;

wherein the specialized dimension object has a second set of dimension attributes for a particular multidimensional dataset from the plurality of multidimensional datasets;

wherein the second set of dimension attributes are not in one or more other multidimensional datasets of the plurality of multidimensional datasets;

in response to receiving a query that references the dimension and targets the particular multidimensional dataset, accessing the base dimension object of the one or more base dimension objects and the specialized dimension object; and generating a set of one or more results for the query based on the base dimension object and the specialized dimension object.

12. The one or more non-transitory computer-readable media of claim 11, the instructions further causing operations comprising:

storing, for a second multidimensional dataset of the plurality of multidimensional datasets, a second specialized dimension object that extends the base dimension object of the one or more base dimension objects;

wherein the second specialized dimension object has a third set of dimension attributes for the second multidimensional dataset;

wherein the third set of dimension attributes is different than the second set of dimension attributes.

13. The one or more non-transitory computer-readable media of claim 12, wherein the dimension, when referenced by the particular multidimensional dataset, is associated with the base dimension object and the specialized dimension object stored for the particular multidimensional dataset;

wherein the dimension, when referenced by the particular multidimensional dataset, is not associated with the second specialized dimension object stored for the second multidimensional dataset.

14. The one or more non-transitory computer-readable media of claim 12, wherein the set of one or more results is generated, based in part, on comparing a first value for a first dimension attribute of the first set of dimension attributes and a second value for the first dimension attribute of the first set of dimension attributes with a target value;

wherein the first value is accessed from the particular multidimensional dataset and the second value is accessed from the second multidimensional dataset;

wherein the set of one or more results includes a third value for a second dimension attribute of the second set of dimension attributes and a fourth value for a third dimension attribute of the third set of dimension attributes;

wherein the third value is accessed from the particular multidimensional dataset and the fourth value is accessed from the second multidimensional dataset.

15. The one or more non-transitory computer-readable media of claim 11, wherein the particular multidimensional dataset stores data according to a star schema;

wherein the star schema defines a view that joins the base dimension object and the specialized dimension object.

16. The one or more non-transitory computer-readable media of claim 11, wherein each base dimension object of the one or more base dimension objects defines a hierarchy for the first set of dimension attributes that is common across the plurality of multidimensional datasets;

wherein the specialized dimension object defines an extended hierarchy that extends the hierarchy for the first set of dimension attributes based on the second set of dimension attributes.

17. The one or more non-transitory computer-readable media of claim 11, wherein the specialized dimension object defines a first specialized drill down path for the dimension when referenced by the particular multidimensional dataset;

wherein a second specialized dimension object defines a second specialized drill down path for the dimension when referenced by a second multidimensional dataset;

wherein the first specialized drill down path is different than the second specialized drill down path for the dimension.

18. The one or more non-transitory computer-readable media of claim 17, wherein the instructions further cause operations comprising generating and displaying a graphical user interface (GUI) object that allows a user to perform a drill down operation and a drill up operation along the first specialized drill down path and along the second specialized drill down path.

19. The one or more non-transitory computer-readable media of claim 11, wherein the one or more base dimension objects include a plurality of base dimension objects are conformed dimension objects.

20. The one or more non-transitory computer-readable media of claim 11, wherein the base dimension object is referenced by two or more multidimensional datasets of the plurality of multidimensional datasets.

* * * * *